(12) United States Patent
Chen et al.

(10) Patent No.: US 8,892,701 B2
(45) Date of Patent: Nov. 18, 2014

(54) WEB PUBLISHING PIPELINE

(75) Inventors: Liang-Ming Chen, Sammamish, WA (US); Vishal R. Joshi, Redmond, WA (US); Timothy Michael McBride, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 12/579,416

(22) Filed: Oct. 15, 2009

(65) Prior Publication Data

US 2011/0093573 A1 Apr. 21, 2011

(51) Int. Cl.
*G06F 15/177* (2006.01)
*G06F 15/173* (2006.01)
*G06F 17/30* (2006.01)

(52) U.S. Cl.
CPC .................................. *G06F 17/3089* (2013.01)
USPC ........................... 709/221; 709/222; 709/223

(58) Field of Classification Search
USPC ......................................................... 709/221
See application file for complete search history.

(56) References Cited

U.S. PATENT DOCUMENTS

| | | | |
|---|---|---|---|
| 7,266,582 B2 | 9/2007 | Stelting | |
| 7,313,757 B2 * | 12/2007 | Bradley et al. | 715/222 |
| 7,349,923 B2 | 3/2008 | Spring et al. | |
| 2004/0103085 A1 | 5/2004 | Ly et al. | |
| 2005/0262439 A1 | 11/2005 | Cameron | |
| 2006/0031481 A1 * | 2/2006 | Patrick et al. | 709/224 |
| 2006/0155529 A1 | 7/2006 | Ludviksson et al. | |
| 2008/0068633 A1 | 3/2008 | Martin | |
| 2010/0293048 A1 * | 11/2010 | Singolda et al. | 705/14.43 |

OTHER PUBLICATIONS

Joshi, Vishal R., "Microsoft Visual Studio 10: Easing Asp.Net Web Deployment", Retrieved at <<http://209.85.229.132/search?q=cache:hnPNJrvqMjsJ:mschnInine.vo.llnwd.net/d1/pdc08/PPTX/PC33.pptx+web+publishing+pipeline&cd=9&hl=en&ct=clnk&gl=in&client=firefox-a>>, 2008, pp. 9.
"Introduction to the Cocoon Web-Publishing Framework", Retrieved at<<http://www.builderau.com.au/program/java/soa/Introduction-to-the-Cocoon-Web-publishing-framework/0,339024620,320265079,00.htm>>, May 31, 2002, pp. 3.
Ranganathan, Harish., "Easing Asp.Net Deployment with VS 2010", Retrieved at <<http://download.microsoft. com/download/F/4/3/F43A79B1-707A-4670-8639-75845F7F3878/Harish_ASPNET_Deployment.pdf>> , 2009, pp. 20.
"How to Create a Deployment Pipeline using Hudson", Retrieved at <<http://www.blackpepper.co.uk/black-pepper-blog/printblog.html?index_php?view=article&id=145&tmpl=component&print=1>>, Sep. 23, 2008, p. 1.

* cited by examiner

*Primary Examiner* — Umar Cheema
(74) *Attorney, Agent, or Firm* — Ben Tabor; Kate Drakos; Micky Minhas

(57) ABSTRACT

Aspects of the subject matter described herein relate to publishing applications from a source environment to a target environment. In aspects, a publishing pipeline has multiple segments in which work related to the publishing is performed. In the pipeline, file data associated with an application is collected. Settings that need to be created and/or changed in target environment are also determined. Transformation actions may also occur to determine and prepare files to be published to the target environment. After the files and settings to publish are determined and the transformation actions occur, the application may then be published to the target environment.

20 Claims, 7 Drawing Sheets

WEB PUBLISHING PIPELINE

BACKGROUND

Deploying a Web application on a Web server is an involved process that has many potential places for error. In many modern Web applications, in addition to the code that executes on the Web server, there may also be other data and configuration changes to make when deploying an application from a development environment to a production environment. When a developer deploys a Web application to a Web server, the developer may copy the application files to the Web server, make some configuration changes, attempt to run the Web server, find configuration and other errors, attempt to troubleshoot the errors, make additional configuration changes, copy additional files, and iterate on this process until the production Web server is correctly configured and has the appropriate content. Besides potential frustration, the process of deploying a Web application on a Web server may consume a great deal of time and energy.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to publishing applications from a source environment to a target environment. In aspects, a publishing pipeline has multiple segments in which work related to the publishing is performed. In the pipeline, file data associated with an application is collected. Settings that need to be created and/or changed in target environment are also determined. Transformation actions may also occur to determine and prepare files to be published to the target environment. After the files and settings to publish are determined and the transformation actions occur, the application may then be published to the target environment.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
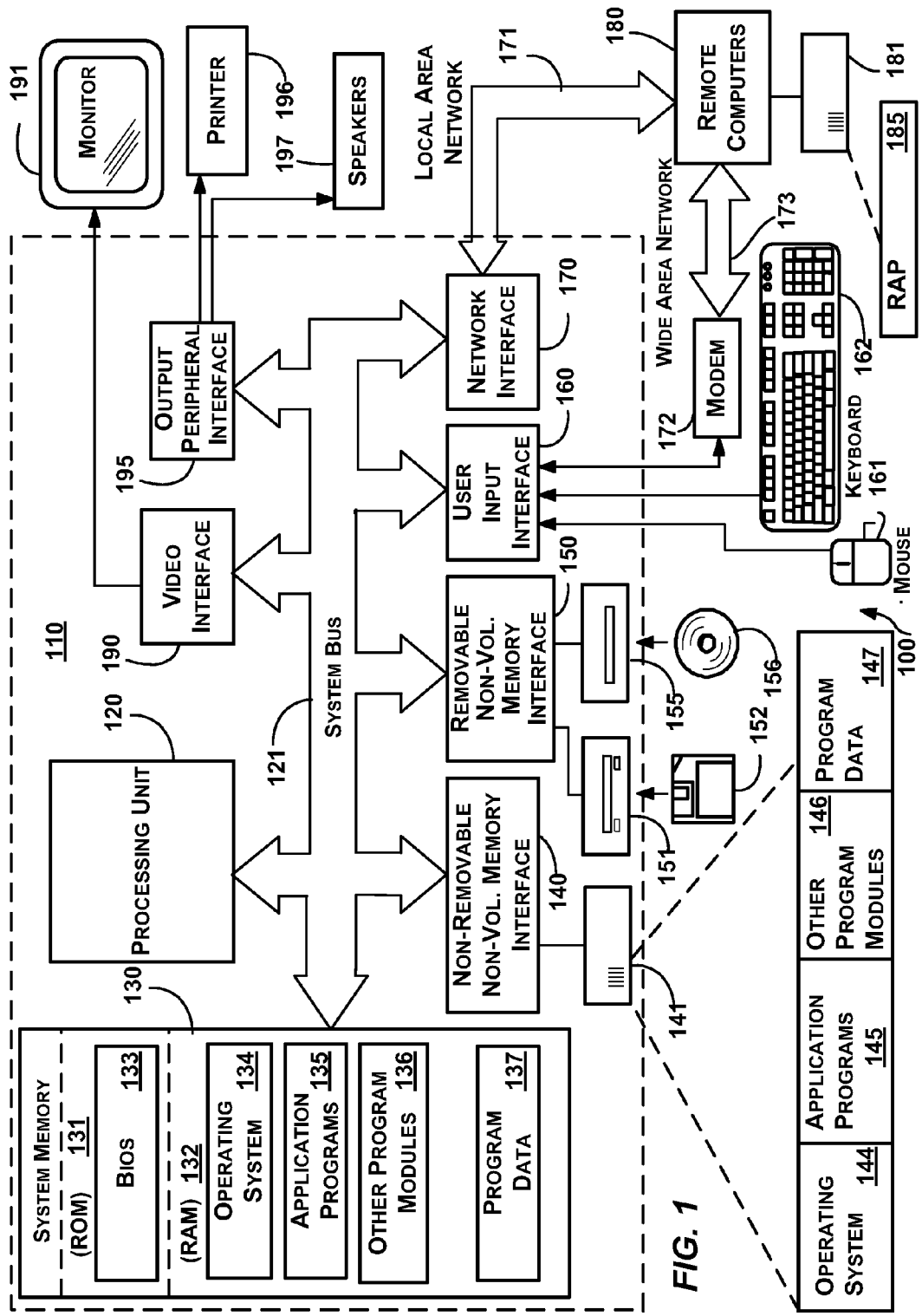
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Publishing Pipeline

As mentioned previously, ensuring that a Web application is deployed correctly may be frustrating and time consuming. Although the term "Web application" is sometimes used herein, the teachings herein may also be applied to other types of applications without departing from the spirit or scope of aspects of the subject matter described herein. An application, as used herein, may include or be associated with one or more executable files and any data, services, or other components used or referenced by the executable files.

Figure 2:
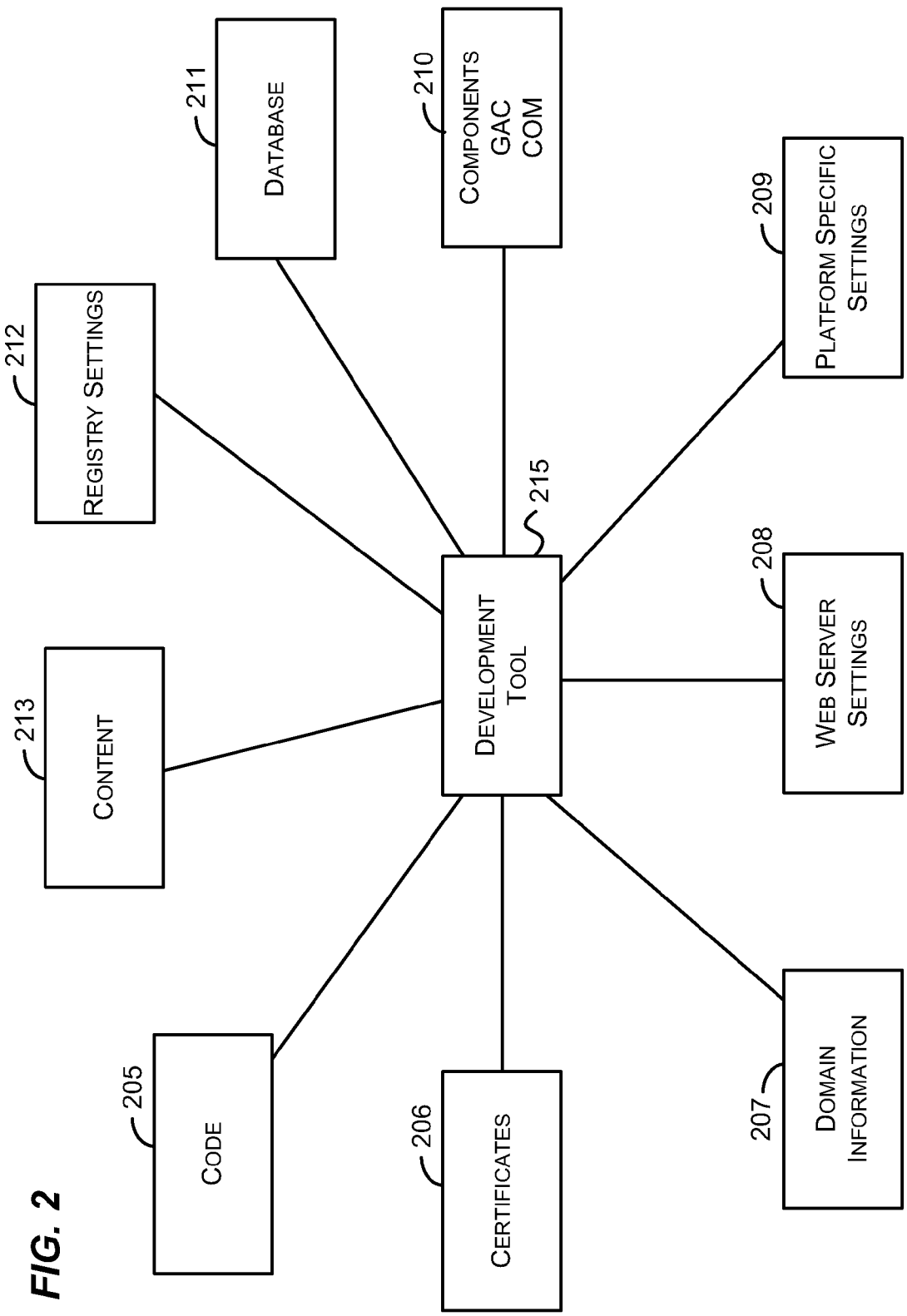
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include code 205, certificates 206, domain information 207, Web server settings 208, platform specific settings 209, components 210, one or more databases 211, registry settings 212, content 213, a development tool 215, and may include other entities (not shown).

The code 205, certificates 206, domain information 207, Web server settings 208, platform specific settings 209, components 210, one or more databases 211, registry settings 212, content 213, and the development tool 215 are sometimes individually referred to herein as an entity or, when referring to two or more of them, as entities. The various entities may be located relatively close to each other or may be distributed around the world. An entity may be stored on a storage media such as volatile or non-volatile memory. An entity may be encoded in one or more files, data structures, and the like.

The entities illustrated in FIG. 2 represent exemplary items that may be included in or associated with a Web application. For example, the code 205 may include instructions that indicate actions a computer is to take. The code 205 may also include data, resources, variables, definitions, relationships, associations, and the like that include information other than actions the computer is to take. In an embodiment, the code may be included in a software project. A software project may include or reference code, the other information indicated above, configuration information, and the like.

The certificates 206 may include data used for security. For example, a certificate may include data usable for authentication, to control access to resources, to establish secure communication channels, for other security purposes, and the like.

The domain information 207 may include data regarding a domain associated with a Web application. For example, the domain information 207 may include a URL of a domain associated with a Web application or other information about the domain.

The Web server settings 208 may include settings data for a Web server. For example, the Web server settings 208 may indicate a default Web page associated with a URL. As another example, the Web server settings 208 may indicate an authentication method to uses for authentication with a Web server. Some other exemplary settings include compression settings, directory browsing settings, error page settings, filter settings, logging settings, SSL settings, caching settings, CGI settings, other settings, and the like.

The platform specific settings 209 may include settings that are specific to a particular platform. For example, some Web servers may use the ASP.NET platform for hosting Web applications. This platform has several settings that may be included in the platform specific settings 209. Similarly, other Web servers may use other platforms for hosting Web applications. Settings particular to these other platforms including version information may be included in the platform specific settings 209.

The components 210 may include components and code that may be shared by multiple applications. For example, in some environments, the components 210 may include a global assembly cache (GAC) and component object model (COM) components.

The one or more databases 211 (hereinafter referred to as the databases 211) may comprise relational databases, object-oriented databases, hierarchical databases, network databases, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

An application hosted by a Web server may need to access data in the databases 211. Access as used herein may include reading data, writing data, deleting data, updating data, a combination including two or more of the above, and the like.

An application hosted by a Web server may need to have various registry settings to be able to execute correctly. These registry settings are represented by the registry settings 212

Content associated with a Web application is represented by the content 213. Content may include images, audio, video, text, documents, Web pages, other content, and the like.

The development tool 215 comprises a component used to develop and/or deploy software. As used herein, the term component is to be read to include all or a portion of a device, a collection of one or more software modules or portions thereof, some combination of one or more software modules or portions thereof and one or more devices or portions thereof, and the like. In one exemplary embodiment, the development tool may comprise an integrated development environment (IDE) that allows a software developer to enter and update code, debug code, create and update databases, associate the code with one or more databases or other components, compile the code, create a package, do other actions, and the like.

The development tool 215 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

The entities described above are not intended to be all-inclusive or exhaustive. Indeed, based on the teachings herein, those skilled in the art may recognize other entities involved with a Web application that may also be included in the environment illustrated in FIG. 2 without departing from the spirit or scope of aspects of the subject matter described herein.

When deploying a Web application to a Web server, one or more of the entities 205-213 or data derived therefrom may need to be deployed. Similarly, when deploying from development environment to a testing environment, or from a testing environment to a staging environment, or between any two environments, one or more of the entities 205-213 or data derived therefrom may need to be deployed in the target environment.

Figure 3:
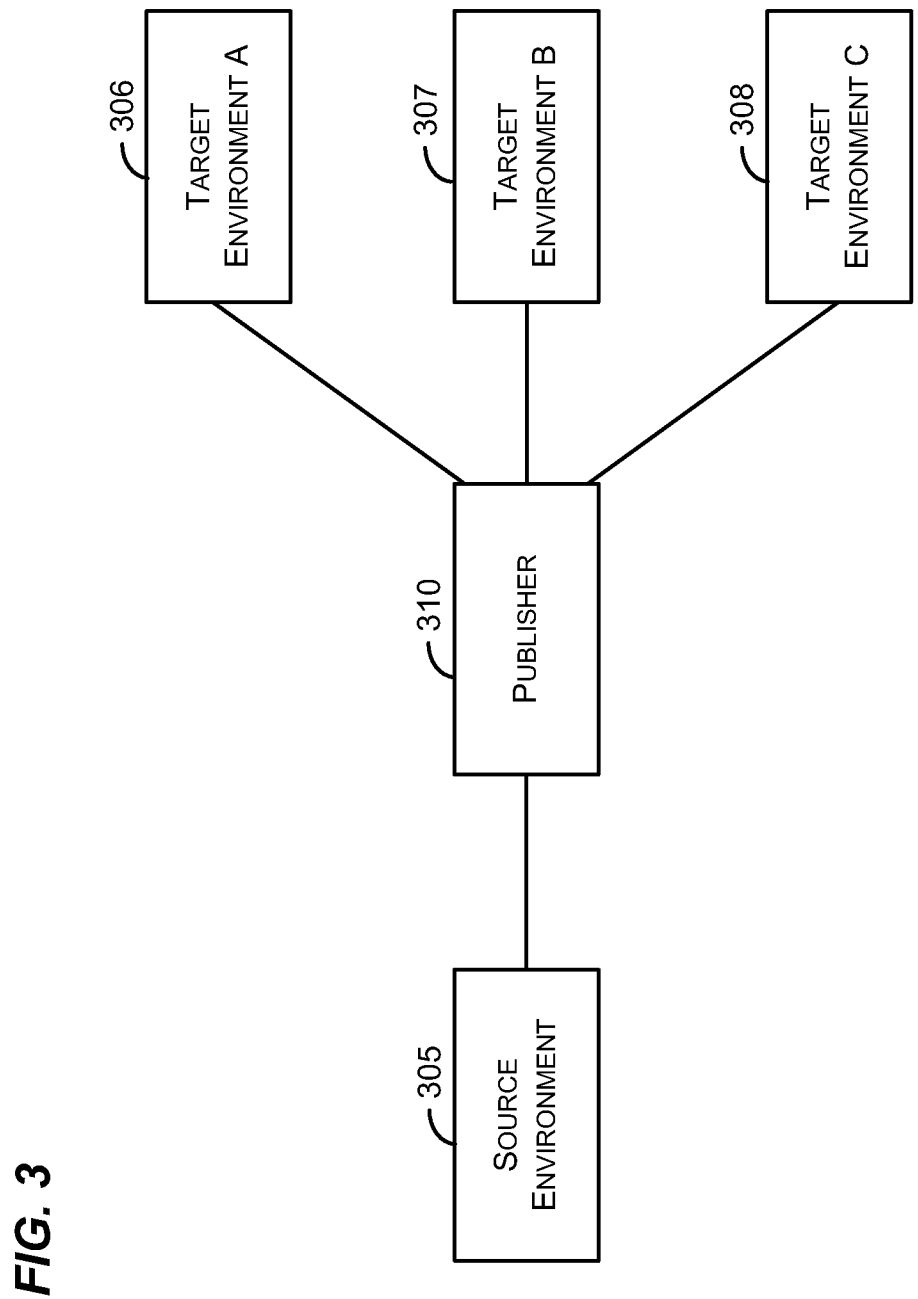
FIG. 3 is a block diagram that representing another environment in which aspects of the subject matter described herein may be implemented.

FIG. 3 is a block diagram that representing another environment in which aspects of the subject matter described herein may be implemented. The environment may include a source environment 305, one or more target environments 306-308, and a publisher 310. The environments 305-308 may include, for example, a development environment as illustrated in FIG. 2, a testing environment, a staging environment, a production environment, or some other environment.

The target environments 306-308 may include virtual or physical targets. The term virtual target includes an environment or a portion thereof that is simulated or emulated by a computer. For example, when a machine is simulated or emulated at the hardware level, the resulting entity is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth. Although a virtual machine is one suitable virtual target, other exemplary virtual targets include virtual environments in which operating systems or portions thereof may be emulated or simulated.

A physical target may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

The publisher 310 is a component that is in charge of publishing a Web application and entities or data derived therefrom from the source environment 305 to one or more of the target environments 306-308. Publishing refers to installing the Web application, any needed components, configuration settings, and content on a target environment. Publishing may occur in environments where the source and target are connected via a network and environments where the source and target are not connected via a network.

In one embodiment, the publisher 310 may be part of the development tool 215 of FIG. 2. In another embodiment, the publisher 310 may be a standalone component. The publisher 310 may collect code and data from the entities of the source environment 305, derive code and data needed for deployment therefrom, and output code and data associated with the application to a desired location. The publisher 310 may be implemented via a pipeline.

Although the environment described above includes various numbers of the entities, it will be recognized that more, fewer, or a different combination of these entities and others may be employed without departing from the spirit or scope of aspects of the subject matter described herein.

Figure 4:
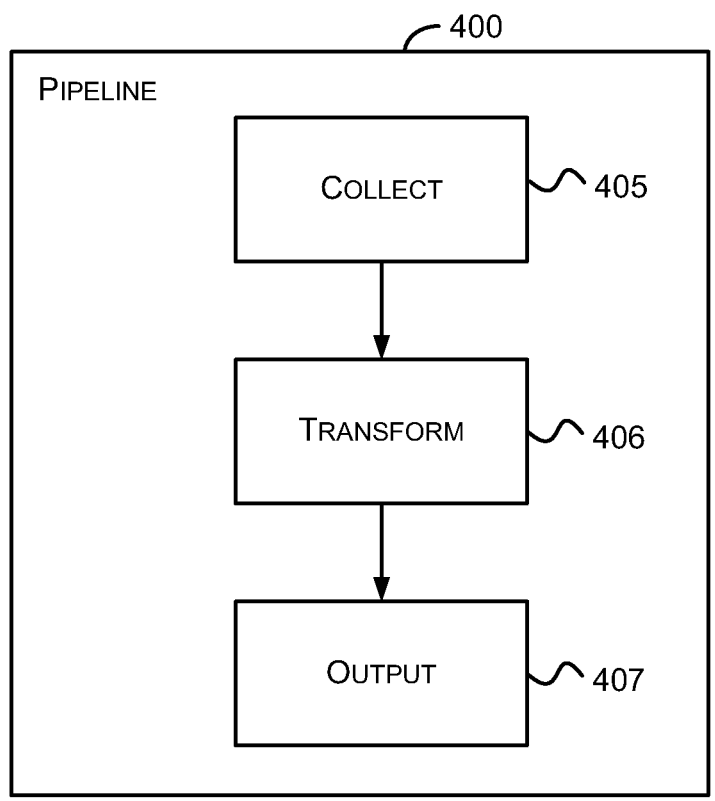
FIG. 4 is a block diagram that generally represents exemplary components of a publishing pipeline in accordance with aspects of the subject matter described herein.

FIG. 4 is a block diagram that generally represents exemplary components of a publishing pipeline in accordance with aspects of the subject matter described herein. The pipeline 400 as illustrated includes a collection segment 405, a transformation segment 406, and an output segment 407.

In the collection segment 405, all files needed for deployment are identified. In one embodiment, an in-memory list may be created. As files are identified by the collection segment 405, they are placed in the list. The collection segment 405 may identify files that include code as well as files that include content or other data. As input, the collection segment 405 may receive whatever code is generated by the development tool 215 as well as code included in the components 210.

Code in one software project may reference code in another software project. When this happens, the code that references the other code is said to depend on the other code. The collection segment 405 may determine any other code upon which code in the application depends. The collection segment 405 may also determine yet other code, if any, that the other code depends on and so forth until the collection segment 405 has determined all code depended on, directly or indirectly, by the application. Files corresponding to the needed code may be placed in the list. Code needed by the application may be included in the code 205 and the components 210 of FIG. 2 as well as other entities.

In some environments, code in certain folders may also be determined by the collection segment 405. For example, in environments using ASP.NET, certain folders corresponding to the ASP.NET platform may be included in a list of files during the collection segment of the pipeline 400.

Also, the collection segment 405 may add whatever files have been specified by a user. For example, a user may specify custom database scripts to execute, End User License Agreements (EULAs), specification documents, other documents, and the like. The collection segment 405 may add file names corresponding to these items to the list.

After all files have been identified by the collection segment 405, the transformation segment 406 may identify changes to prepare the application, associated content, and configuration files for the target environment. For example, there may be test pages, images, and other content in a development environment that are not to go to a production environment. Files associated with the content may be identified during the collection segment 405 and placed in a list. During the transformation segment 406, files that are not to be published may be flagged for deletion from the list.

As another example, a configuration file may identify a connection string that connects to a development database of a development environment. The production environment, however, may have a production database from which the application is to access data. During the transformation segment 406, the connection string may be changed as appropriate for the production database.

As another example, a configuration file may identify IP addresses or names of source environment servers. For example, a production server may use a different e-mail server than a development server. These IP addresses or names may need to be changed when moving to a destination environment.

As another example, an e-mail address (e.g., a contact e-mail address) may be different from one environment to another. During the transformation segment 406, changes may be indicated as appropriate for the target environment.

A user may specify certain files that are not to be published to a target environment. During the transformation segment, if these files exist in the list, they may be flagged for deletion from the list.

Note that flagging an item for deletion may not immediately cause the item to be deleted from the list. At a subsequent segment of sub-segment of the pipeline, for example, it may be determined that the item is needed and the flag marking the item for deletion may be removed.

After the list is complete, further transformation actions may occur during the transformation segment 406. For example, files corresponding to the list may be copied to a location such as a folder, drive, partition, or the like. This is sometimes referred to as "materializing."

After the files are materialized, pre-compilation may occur to compile some files into one or more dynamic link libraries (DLLs), binaries, or the like. Furthermore, during pre-compilation or afterwards, output from the pre-compilation may be merged or otherwise grouped. For example, a user may specify that there is to be one DLL per folder, per page, per site, or may specify some other DLL configuration. During the transformation segment 406, files may be compiled into DLLs according to user indications.

After the actions of the transformation segment 406 are completed, the actions of the output segment may commence. A user may indicate that simple publishing is to occur during the output phase. In this case, the materialized files may be copied to a destination environment using FTP, HTTP, a file system command, some other transport mechanism, or the like. After the files are copied, a user may configure the target environment.

If a user indicates more automated publishing, a package may be created that include the materialized files together with any configuration changes needed for the target environment. As one example, publishing in this case may include one or more of the following:

1. Identifying components (e.g., GAC, COM, and the like);
2. Identifying registry changes for the target environment;
3. Identifying Web server settings and certificates for the target environment;
4. Identifying database operations to publish to the target environment; and
5. Identifying any scripts or code to execute in configuring the target environment.

In conjunction with identifying the above, in one embodiment, a package may be created. The package 225 may be a self-extracting file or files, a set of one or more files that are not self-extracting, an in-memory representation of the materialized files and configuration changes, and the like. The package may be structured in a manner consistent with a tool capable of using the package to install the files on the target environment and configure the target environment with the configuration changes included in the package.

In the embodiment above, the package may then be published to the target environment. Publishing the package may include installing files from the package and making configuration changes in accordance with the package. Making the configuration changes may involve installing components, making registry changes, configuring Web server settings, installing certificates, installing, populating, and/or updating data in one or more database, executing scripts or other code, and the like.

In another embodiment, the materialized files and configuration changes may be published to a target environment without placing them in a package. In this embodiment, a deployment tool may read the files and configuration changes from their materialized location, contact an install agent on a server of the target environment, and use the install agent to install the files and complete the configuration changes to the target environment.

Each segment of the pipeline 400 may be further segmented into sub-segments. Furthermore, the pipeline 400 may allow one or more processes to be called before and/or after each segment and/or sub-segment. When and what processes to call may be indicated by a configuration file that specifies one or more pipeline segments or sub-segments and one or more processes to call. Each called process may be given a pointer to the list of files and may add to, mark for deletion, change, or otherwise access the list as desired. Each called process may also perform actions other than accessing the list. For example, a called process may send an e-mail to a user regarding an included or non-included file, perform one or more computations, perform other actions, and the like.

Figure 5:
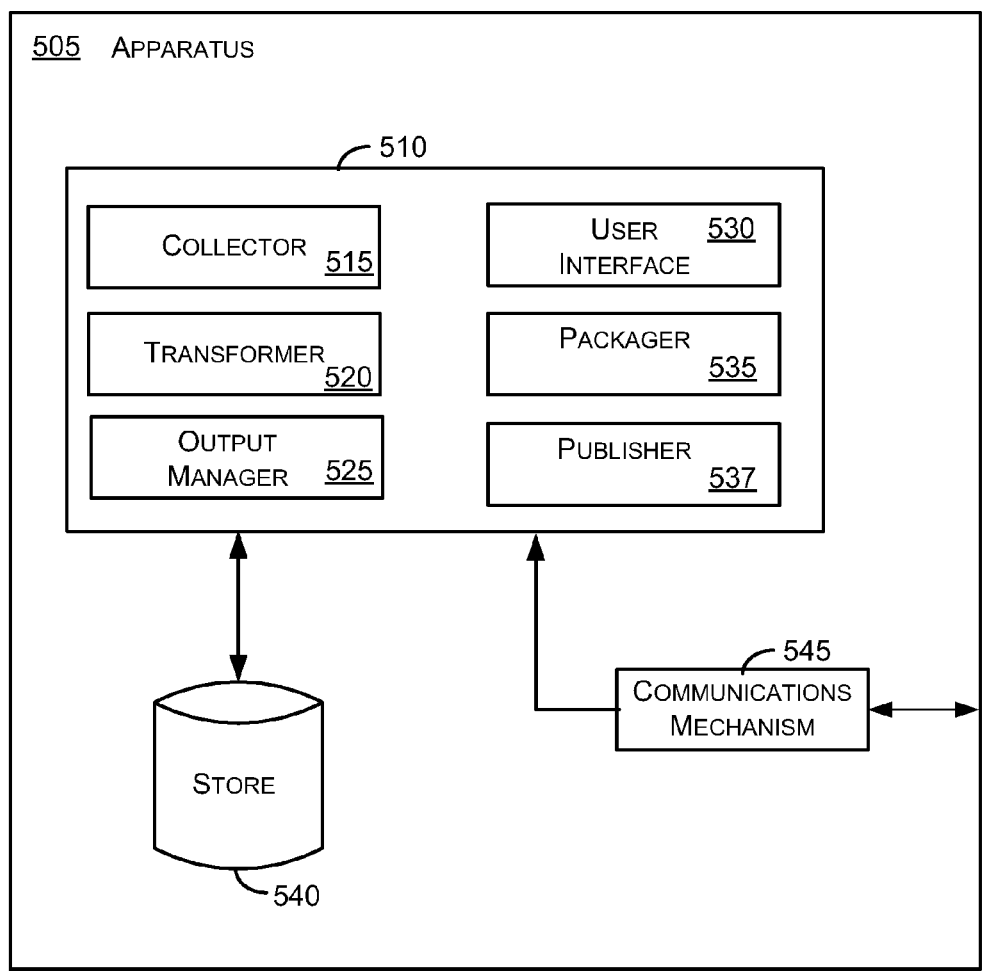
FIG. 5 is a block diagram that represents an apparatus configured in accordance with aspects of the subject matter described herein.

FIG. 5 is a block diagram that represents an apparatus configured in accordance with aspects of the subject matter described herein. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices.

Turning to FIG. 5, the apparatus 505 may include pipeline components 510, a store 540, a communications mechanism 545, and other components (not shown). The apparatus 505 may host the development tool 215 and may have access to the other entities described in conjunction with FIG. 2. The apparatus 505 may be implemented on or as a computer (e.g., as the computer 110 of FIG. 1).

The pipeline components 510 may be included as part of the development tool 215 or may be separate from the development tool 215 of FIG. 2. The pipeline components 510 may include a collector 515, a transformer 520, an output manager 525, a user interface 530, a packager 535, a publisher 537, and other components (not shown).

The communications mechanism 545 allows the apparatus 505 to communicate with other entities. For example, referring to FIG. 3, the communications mechanism 545 may allow the apparatus to communicate with entities the target environments 306-308. The communications mechanism 545 may be a network interface or adapter 170, modem 172, or any other mechanism for establishing communications as described in conjunction with FIG. 1.

The store 540 is any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 540 may comprise a file system, database, volatile memory such as RAM, other storage, some combination of the above, and the like and may be distributed across multiple devices. The store 540 may be external, internal, or include components that are both internal and external to the apparatus 505.

The collector 515 may be operable to collect file data about files of an application. File data may include, for example, names and locations of the files. The files of an application may include the output files provided by a development tool, files that a user indicates are to be published, and any related files. The collector 515 may read through files and determine other files upon which the files depend. For files that include code, determining other files upon which the files depend may involve reading the code and finding any references in the code that reference other code that is not included in the files. Using these references, the collector 515 may then determine files that include the referenced code. The collector 515 may also collect file data for any other files that files of an application depend on.

The collector 515 may be further operable to collect configuration data of the source environment. The configuration data may indicate settings associated with the application when executing in the source environment. One or more of these settings may need to be changed in conjunction with publishing the application to a target environment.

The transformer 520 is operable to transform the file data and the configuration data to transformed data usable for publishing the application in a target environment. Transforming the file data may, for example, include one or more of flagging one or more of the files for deletion, adding one or more additional files to a list of files to be published, pre-compiling one or more of the files, determining configuration data suitable for the application to execute in the target environment, merging one or more of the files or portions thereof in a library, and other actions described previously.

The output manager 525 is operable to send files associated with the transformed data to a publishing location. For example, the output manager 525 may copy files associated with the application to a folder. The output manager 525 may be further operable to indicate settings to change in the target environment in conjunction with publishing the application to the target environment.

The user interface 530 may be operable to receive settings, instructions, file locations, and the like from a user and to provide feedback as to the activity of the pipeline components 510.

The packager 535 may be operable to place the files and settings in a package for use in publishing the application to the target environment. In some embodiments, the files and settings may be published without the use of a package.

The publisher 537 may be operable to install the application and any needed components and content in a target environment. The publisher 537 may also be operable to make any data and configuration changes needed in conjunction with installing the application.

Figure 6:
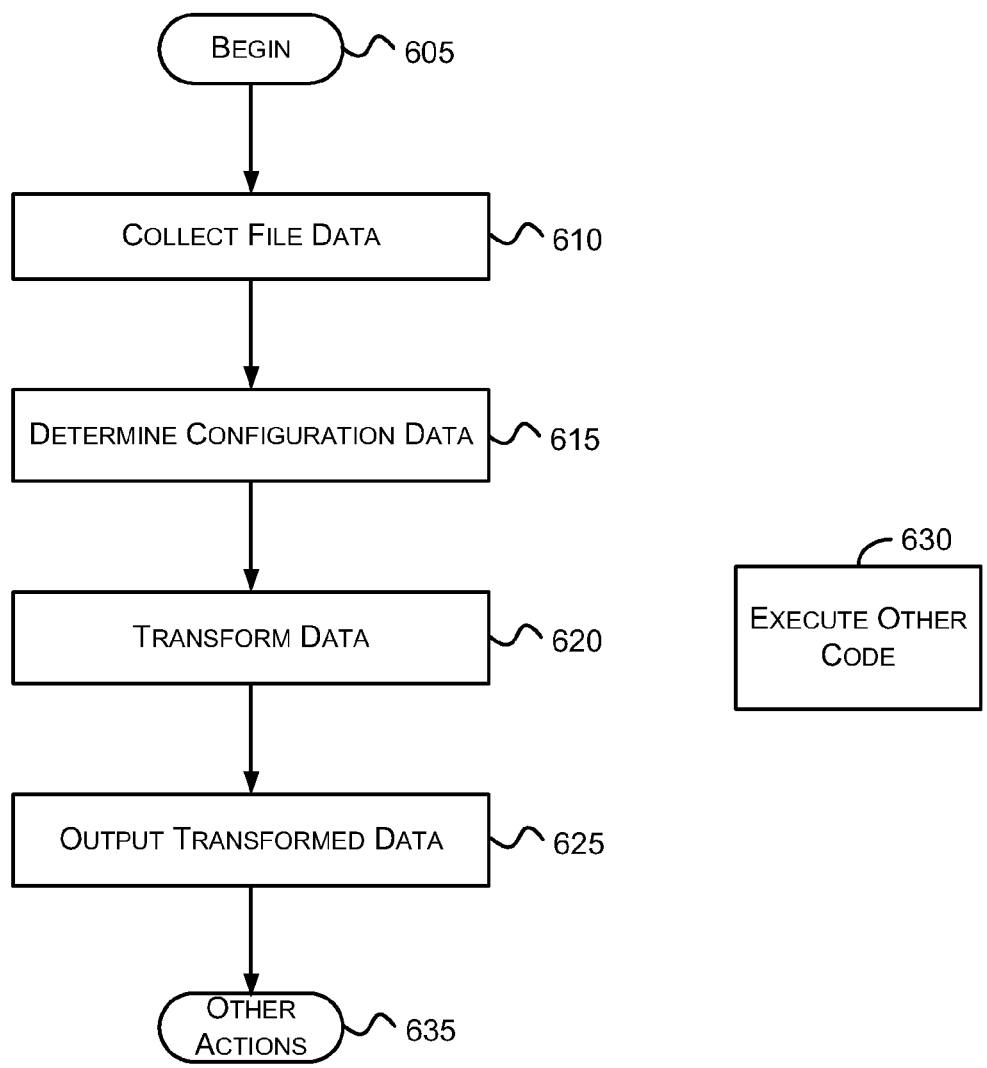
FIG. 6 is a flow diagram that represents exemplary actions that may occur in a publishing pipeline in accordance with aspects of the subject matter described herein.
Figure 7:
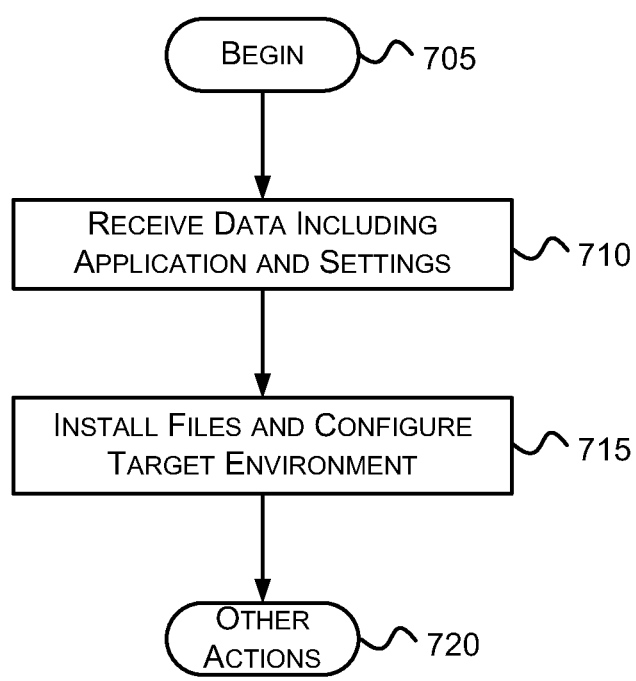
FIG. 7 is a flow diagram that represents exemplary actions that may occur in a target environment in accordance with aspects of the subject matter described herein.

FIGS. 6-7 are flow diagrams that generally represent actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that represents exemplary actions that may occur in a publishing pipeline in accordance with aspects of the subject matter described herein. Turning to FIG. 6, at block 605, the actions begin. For example, referring to FIG. 5, a user may indicate via the user interface 530 that an application is to be published to a target environment. As another example, another event (e.g., such as a nightly build of a project, detection of an instruction to create a package, detection of an instruction to pre-compile and merge application files, and the like) may trigger publishing an application.

At block 610, file data is collected. For example, referring to FIG. 4, in the collection segment 405 of the pipeline 400, file names and locations regarding files associated with an application are collected. For example, collecting file data may include determining the files included in the application, determining other code upon which code in the files depends, and determining one or more files that include the other code.

As another example, collecting file data may include obtaining names and locations of the files and placing the names and locations in an in-memory list.

As another example, collecting file may include collecting data that identifies platform files associated with the application.

As yet another example, collecting file data about files associated with an application may include collecting names and locations regarding files that have been indicated via a user interface. As mentioned previously, a user interface may allow a user to indicate other files (e.g., a EULA or some other file) that the user wants to have published with the application. During the actions of block 610, file data about these other files may be collected.

The examples above are not intended to be all-inclusive or exhaustive of the actions that may occur at block 610. Indeed, other file collection actions have been mentioned elsewhere in the document. Furthermore, based on the teachings herein, those skilled in the art may recognize other file data collection activities that may occur at block 610 without departing from the spirit or scope of aspects of the subject matter described herein.

At block 615, configuration data is determined. For example, referring to FIG. 5, the collector 515 may determine configuration data regarding an application. As described previously, this configuration data may indicate settings to create and/or set in conjunction with publishing the application to the target environment. As some examples, the configuration data may include an identifier of a server with which the application is configured to interact, a connection string usable to connect the application with a database of the target environment, other configuration data mentioned previously, and the like.

At block 620, data is transformed. For example, referring to FIG. 5, the transformer 520 transforms data to make it suitable for the target environment. As some examples, transforming data may include flagging one or more of the files to exclude the one or more files from publishing to the target environment, pre-compiling one or more files indicated by the transformed data, determining configuration settings that are suitable for the target environment, other transformation actions indicated previously, and the like.

At block 625, the transformed data is outputted. For example, outputting the transformed data may include installing files indicated by the transformed data on the target environment and changing configuration of the target environment to be suitable for use by the application when the application is executed in the target environment.

As another example, outputting the transformed data may include creating a package that includes configuration data and the files indicated by the transformed data. The configuration data in the package may indicate settings to create and/or change in the target environment in conjunction with publishing the application to the target environment.

At block 630, other code, if any, is executed. As mentioned previously, before or after one or more segments or sub-segments of the publishing pipeline, one or more processes may be called. In these one or more processes, for example, custom actions defined by a user, system administrator, or the like may occur.

At block 635, other actions, if any, are performed.

FIG. 7 is a flow diagram that represents exemplary actions that may occur in a target environment in accordance with aspects of the subject matter described herein. Turning to FIG. 7, at block 705, the actions begin. For example, referring to FIG. 3, the actions may commence when the publisher 310 sends publishing data to one or more entities (e.g., servers or other computing devices) of the target environments 306-308.

At block 710, the data is received. For example, referring to FIG. 3, one or more entities of target environment 306 may receive the publishing data. This publishing data may include files, configuration data, other publishing information, and the like. In one embodiment, the publishing data may be included in a package that includes the files and an indication of settings to create and/or change in the target environment.

At block 715, the files are installed and one or more entities in the target environment are configured according to the settings. For example, referring to FIG. 3, one or more servers of the target environment 306 may have files installed thereon and settings created and/or changed as indicated by the publishing data.

At block 720, other actions, if any, may occur.

As can be seen from the foregoing detailed description, aspects have been described related to publishing applications. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

in a collection segment of a publishing pipeline, identifying a plurality of files associated with an application in a source environment comprising a development environment, a testing environment, a staging environment, or a production environment, collecting file data about the plurality of files associated with the application, the application configured to operate in the source environment, the file data including code of the application, a certificate, domain information, a server setting, a platform specific setting, one or more databases, or a registry setting;

in a transformation segment of the publishing pipeline, performing a transformation on the file data to create transformed data usable for publishing the application on a target environment; and in an outputting segment of the publishing pipeline, outputting the transformed data to a storage location, the storage location being accessible by the target environment for installing the application on the target environment.

2. The method of claim 1, wherein collecting the file data about the plurality of files associated with the application comprises obtaining names and locations of the plurality of files and placing the names and the locations in an in-memory list.

3. The method of claim 1, wherein collecting the file data about the plurality of files associated with the application comprises determining the plurality of files included in the application, determining other code upon which code in the plurality of files depends, and determining one or more other files that include the other code.

4. The method of claim 1, wherein collecting the file data about the plurality of files associated with the application comprises collecting data that identifies one or more platform files associated with the application.

5. The method of claim 1, wherein collecting the file data about the plurality of files associated with the application comprises collecting names and locations regarding one or more files that have been indicated via a user interface.

6. The method of claim 1, wherein performing the transformation on the file data to create transformed data comprises flagging one or more files of the plurality of files to exclude the one or more files of the plurality of files from publishing to the target environment.

7. The method of claim 1, wherein performing the transformation on the file data to create transformed data comprises pre-compiling one or more files of the plurality of files and/or one or more files indicated via a user interface.

8. The method of claim 1, further comprising determining configuration data associated with the application, the configuration data indicating settings to create and/or set in conjunction with publishing the application to the target environment.

9. The method of claim 8, wherein determining the configuration data associated with the application comprises determining an identifier of a server and a version of a platform with which the application is configured to interact.

10. The method of claim 8, wherein determining the configuration data associated with the application comprises determining a connection string, using the connection string to connect the application with a database of the target environment.

11. The method of claim 8, further comprising outputting the configuration data in conjunction with outputting the transformed data.

12. The method of claim 1, wherein outputting the transformed data comprises installing files indicated by the transformed data on the target environment and changing configuration of the target environment to be suitable for use by the application when the application is executed in the target environment.

13. The method of claim 1, wherein outputting the transformed data comprises creating a package that includes configuration data and the files indicated by the transformed data, the configuration data indicating settings to create and/or change in the target environment in conjunction with publishing the application to the target environment.

14. The method of claim 1, further comprising executing the code outside of the publishing pipeline before or after a segment or sub-segment of the publishing pipeline according to a data structure, the data structure indicating the code and an ordering of the code's execution relative to the segment or sub-segment of the publishing pipeline.

15. In a computing environment, an apparatus, comprising:
one or more memories operatively coupled to one or more processors providing:
- a collector, the collector automatically collecting file data about a plurality of files of an application that is configured to operate in a source environment comprising a development environment, a testing environment, a staging environment, or a production environment, the collector further collecting configuration data of the source environment, the configuration data indicating settings associated with the application when executing in the source environment, the plurality of files including first other code in a first file upon which code in the application depends and second other code in a second file upon which the first other code depends;
- a transformer, the transformer transforming the file data and the configuration data to transformed data; and
- an output manager, the output manager sending one or more transformed files including the transformed data to a publishing location, the output manager further indicating settings to create or change in a target environment in conjunction with publishing the application to the target environment using the transformed data.

16. The apparatus of claim 15, further comprising a packager operable to place the one or more transformed files and the settings in a package for publishing the application to the target environment.

17. The apparatus of claim 15, wherein the transformer is operable to transform the file data and the configuration data to the transformed data by being operable to perform actions including flagging one or more of the plurality of files for deletion, adding one or more additional files to a list of files to be published, precompiling one or more of the plurality of files, determining configuration data suitable for the application to execute in the target environment, and merging one or more of the plurality of files or portions thereof in a library.

18. The apparatus of claim 15, wherein the collector is operable to collect the file data about the plurality of files of the application by being operable to determine file names and locations of the plurality of files, to determine other code upon which code in the plurality of files depends, and to determine references in the code that reference the other code.

19. A computer storage medium, the computer storage medium not being a propagating signal, storing computer-executable instructions, which when executed perform actions, comprising:
- receiving, at one or more entities of a target environment, data that includes an application and configuration data, the data generated by a publishing pipeline that includes a collection segment, a transformation segment, and an output segment, the collection segment responsible at least for determining files associated with the application directly or indirectly, the transformation segment responsible at least for transforming the files and determining configuration settings to suit the target environment;
- pre-compiling one or more of the files and determining the configuration data for the application to execute correctly in the target environment; and
- installing the files as transformed and configuring the one or more entities of the target environment according to the configuration settings.

20. The computer storage medium of claim 19, wherein receiving data that includes the application and the configuration data comprises receiving a package that includes the files as transformed and an indication of the configuration settings.

* * * * *